United States Patent

[11] 3,602,810

[72] Inventor Frank Di Nicolantonio
 Williamsville, N.Y.
[21] Appl. No. 797,639
[22] Filed Feb. 7, 1969
[45] Patented Aug. 31, 1971
[73] Assignee Westinghouse Electric Corporation
 Pittsburgh, Pa.

[54] TESTING SYSTEM FOR CIRCUIT POINTS THAT ARE NORMALLY OPERATED IN A PREDETERMINED SEQUENCE
 12 Claims, 7 Drawing Figs.
[52] U.S. Cl. ................................................. 324/73, 324/140
[51] Int. Cl. ................................................. G01r 15/12, G01r 7/00
[50] Field of Search ........................................... 324/73, 121, 158, 126, 140

[56] References Cited
UNITED STATES PATENTS
2,878,450 3/1959 Rabier ...................... 324/121
3,398,363 8/1968 Mortley ...................... 324/73
2,588,209 3/1952 Crapuchettes ............... 324/140 X Primary Examiner—Alfred E. Smith
Attorneys—F. H. Henson, C. F. Renz and A. S. Oddi ABSTRACT: A system for monitoring the operation of a circuit configuration including test circuit points therein is disclosed wherein a test network is utilized including a plurality of impedance elements, such as resistors, coupled between the test circuit points and a load impedance element, such as a resistor, with the output from the load impedance element being sensed by, for example, an oscilloscope. The plurality of impedance elements are selected to have a predetermined relationship with respect to each other, such as being weighted for monitoring a counting operation or having substantially equal values for a sequential operation.

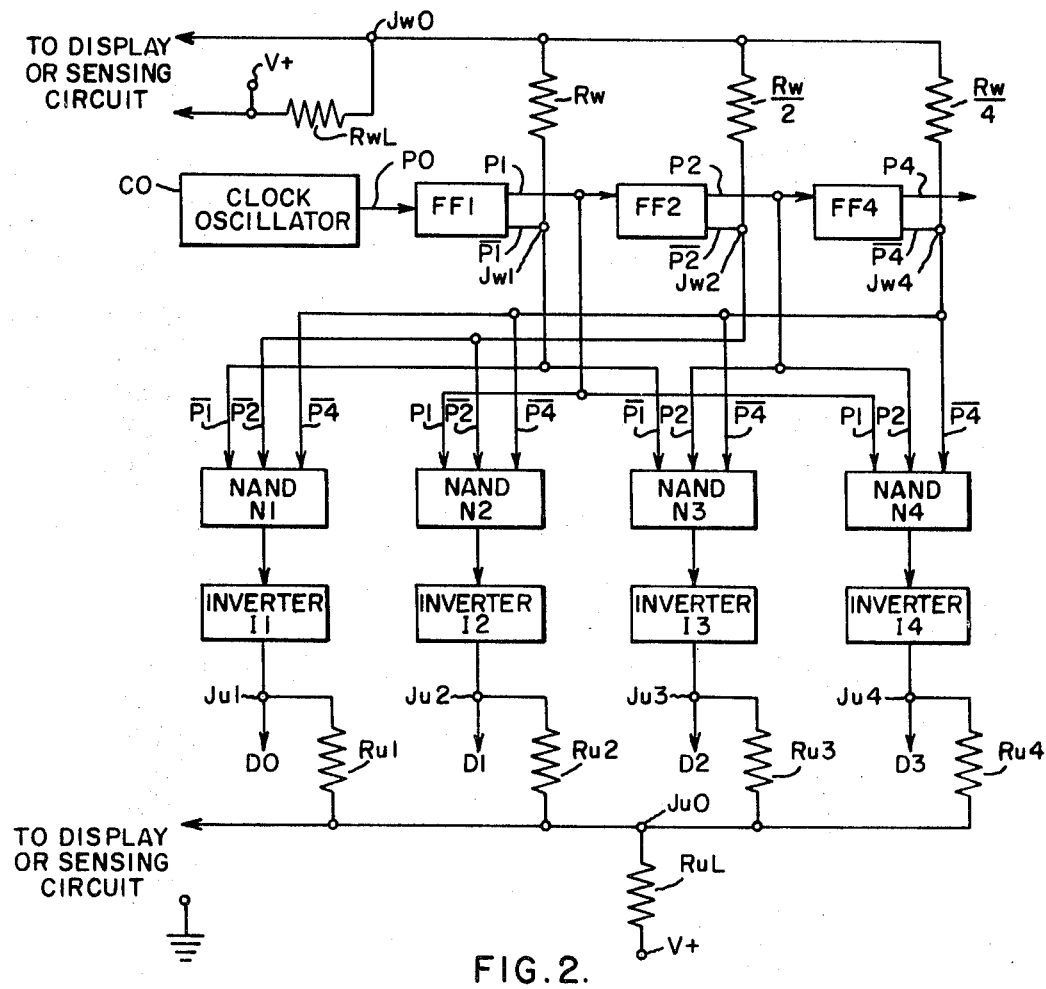
FIG. 2.
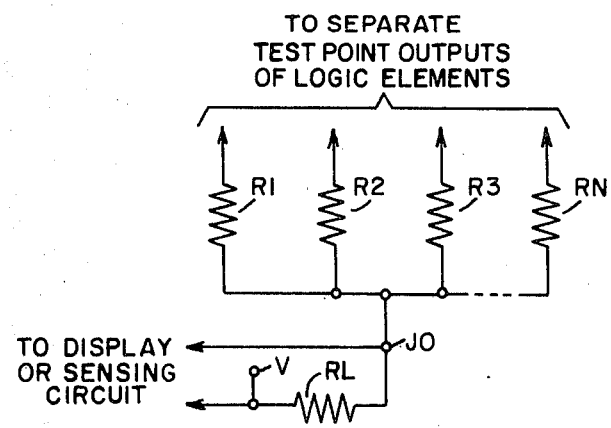
FIG. 1.
INVENTOR
Frank DiNicolantonio
BY
ATTORNEY

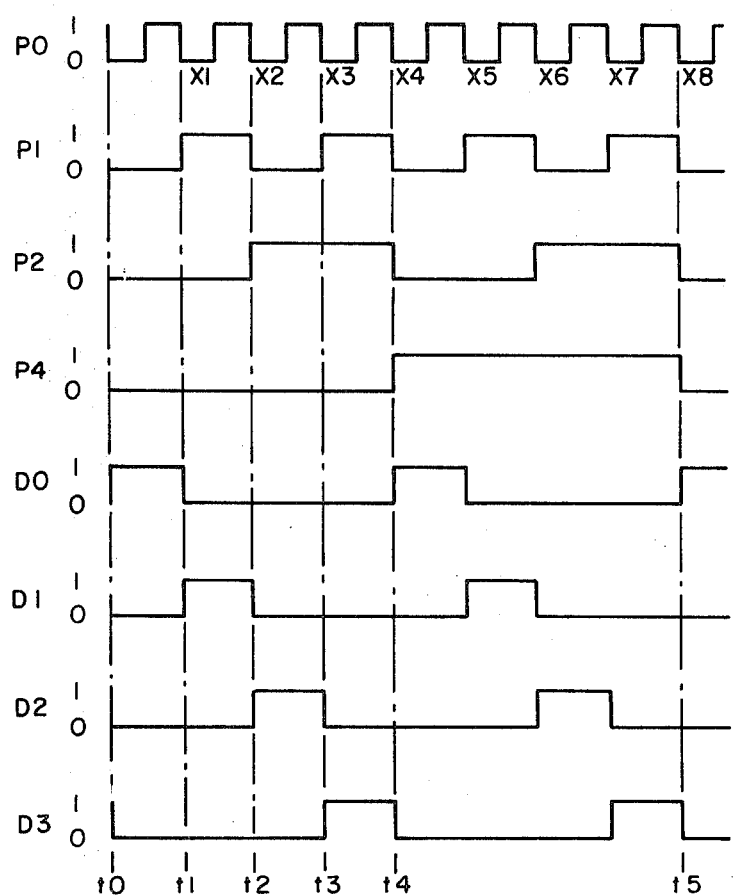
FIG. 3.
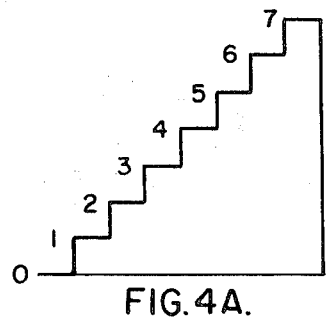
FIG. 4A.
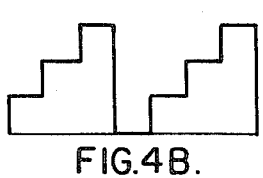
FIG. 4B.
FIG. 5A.   FIG. 5B.

3,602,810

TESTING SYSTEM FOR CIRCUIT POINTS THAT ARE NORMALLY OPERATED IN A PREDETERMINED SEQUENCE

BACKGROUND OF THE INVENTION

1. Field of the Invention

The present invention relates to systems for determining the output of various points in a circuit configuration and, more particularly, to systems for monitoring the operation of the circuit configuration.

2. Discussion of the Prior Art

Because of the multiplicity of logic components in digital systems, testing or monitoring the operation of the system and tracking down any malfunction in the system become serious considerations. Each of the logic components is ordinarily checked for operability prior to interconnection into the total system. Also the logic components commonly are tested once interconnected into the system under test conditions, that is, prior to placing the total system in its normal operating mode. The testing of the various components ever under test conditions is a tedious and time consuming task and does not of necessity insure that once the system is put into its normal operating mode that proper operation will result.

In a test procedure it is standard practice to select certain test points within a circuit configuration and to check the output of this circuit point to determine whether it is proper for the given test procedure. The common method of doing this is merely to connect the selected test point to an oscilloscope to display the waveform developed at the test point. In this manner the various test points of the system configuration can be checked individually. If a multichannel oscilloscope is utilized, for example, a four-channel oscilloscope, four individual outputs for circuit points could be displayed at one time. However, even using a multichannel oscilloscope, the number of circuit point outputs that can be observed at a given time is limited, and it is required that these outputs are disconnected so that others may be displayed as the testing procedure continues. Moreover, such a test procedure again does not insure that once a system is placed in its normal mode of operation that the system will operate as intended. Monitoring the operation of a digital system once placed in its normal mode of operation is quite difficult due to the limited number of test points that can be observed even with a multichannel oscilloscope, and, moreover, most digital systems are not adapted for testing or monitoring while in operation. If a malfunction should occur in the system operation, it is very difficult to determine which of the logic components is improperly operating or even to isolate the particular logic function which is causing the difficulty. It would thus be highly desirable if the digital system could be monitored when it is in its normal mode of operation, and if a malfunction should occur that the source of the malfunction could be quickly traced for corrective action. Moreover, it would be highly advantageous if the monitoring system required a minimum of additional components and would permit the display of outputs from a large number of circuit points of the circuit configuration.

SUMMARY OF THE INVENTION

Broadly, the present invention provides a system for monitoring the operation of a circuit configuration wherein a testing network is utilized for monitoring the composite output of a plurality of test circuit points of the circuit configuration, with the composite output being indicative of the operation of the circuit configuration.

BRIEF DESCRIPTION OF THE DRAWING

FIG. 1 is a schematic diagram of the testing network as utilized in the present invention;

FIG. 2 is a block diagram of a circuit configuration wherein testing networks of the present invention are incorporated therein;

FIG. 3 is a waveform diagram including various curves used in explaining the operation of FIG. 2;

FIGS. 4A and 4B are display waveform outputs indicative of different modes of operation of the circuit configuration of FIG. 2; and FIGS. 5A and 5B are display waveform outputs indicative of two different modes of operation of the circuit configuration of FIG. 2.

DESCRIPTION OF THE PREFERRED EMBODIMENTS

Referring to FIG. 1, the basic testing network of the present invention is shown. A plurality of impedance elements R1, R2, R3, ... RN, which may comprise resistors, have one end commonly connected and the other free ends are to be connected to separate test point outputs of various logic elements of a circuit configuration. At the respective test circuit points either a binary 1 or 0 logic output will be developed at a given instant in time. The commonly connected end of the resistors R1, R2, R3, ... RN define a sensing junction JO. A load impedance element RL, which may comprise a resistor, is connected between the sensing junction JO and a source of operating potential which supplies a direct voltage V. The voltage supply V may comprise a direct voltage of positive or negative polarity of a predetermined magnitude depending upon the connection of the network into a circuit configuration.

Of the plurality of resistors, three are shown in solid lines R1, R2 and R3 and the resistor RN is shown in dotted lines to indicate that any selected number of resistors can be utilized in the plurality with the respective free ends thereof being connected to a designated test circuit point of the circuit configuration.

The resistors R1, R2, R3, ... RN are selected to have a predetermined relationship with respect to each other and in a "weighted" type of testing network the resistance values will be weighted, while in other applications termed an "unweighted" type of testing network the resistors will all have substantially the same resistance. The load resistor RL may be selected at any convenient value of the particular configuration. The load resistor RL carries the total current applied to the respective plurality of resistors R1, R2, R3, ... RN, and, in response to the total current, a composite voltage is developed across the load resistor RL. The composite voltage is sensed at the sensing junction JO and is applied to a display or sensing circuit which may ideally comprise a pair of vertical deflection plates of an oscilloscope. For each testing network as shown in FIG. 1, only one channel of the oscilloscope is required for displaying the composite signal appearing across the load resistor RL in response to the individual outputs of the selected test circuit points as applied to the resistors R1, R2, R3, ... RN.

FIG. 2 shows a circuit configuration employing a plurality of logic components arranged in a predetermined manner to perform a desired logic function. Testing networks of the weighted and unweighted types are incorporated into the circuit configuration of FIG. 2 and are connected to selected test circuit points for monitoring the operation of the circuit configuration. The circuit configuration as shown in FIG. 2 is given herein only by way of example for demonstrating the use of the two types of testing networks, and it should be understood that the testing networks could be incorporated into any circuit configuration utilizing logic components.

The circuit configuration as shown in FIG. 2 is intended to perform the function of generating four separate pulse outputs DO, D1, D2 and D3, which have a predetermined time duration and time sequence as shown in FIG. 3, curves DO, D1, D2 and D3, respectively. The outputs DO, D1, D2 and D3 are generated in response to the output of a clock oscillator CO which is shown as waveform PO of FIG. 3. The clock output PO is applied to a first bistable flip-flop circuit FF1 which supplies in response thereto an output P1, shown in curve P1 of FIG. 3, and also a complementary output $\overline{P1}$ at a separate output. The flip-flop FF1 is responsive to the output PO of the clock oscillator CO so that it changes states whenever output P0 changes from a 1 logic state to a 0 logic state. For the purposes of explanation, it may be assumed that a 1 logic state is a positive voltage and a 0 logic state is ground potential.

Thus, as shown in FIG. 3, the output P1 of the flip-flop FF1 is at one-half the frequency of the clock output P0. The output P1 of the flip-flop FF1 is applied to a second bistable flip-flop FF2 which is responsive to change state whenever the output P1 of the flip-flop FF1 changes from a 1 to a 0 logic state. The flip-flop FF2 supplies an output P2 as shown in curve P2 of FIG. 3 and a complementary output $\overline{P2}$. The frequency of the output P2 is at one-half the frequency of the output P1. A third bistable flip-flop FF4 is also provided and received the output P2 and is responsive to the change of the output P2 of the flip-flop FF2 changing from a 1 to a 0 state. The flip-flop FF4 provides an output P4 as shown in curve P4 of FIG. 3 and a complementary output $\overline{P4}$. The frequency of the output P4 is one-half the frequency of the output P2. The output P4 from the flip-flop FF4, if desired, may be supplied to other flip-flop circuits or other logic components if desired. In the present example only three flip-flops FF1, FF2 and FF4 have been shown capable of counting to the number seven before resetting. If higher number counts are desired, of course, additional flip-flop states could be added. In FIG. 3 only the primary outputs P1, P2 and P4 are shown. The complementary outputs $\overline{P1}$, $\overline{P2}$ and $\overline{P4}$ have not been shown in that they are the logical inverse of the primary outputs P1, P2 and P4, respectively.

Receiving the outputs P1, P2 and the complementary outputs $\overline{P1}$, $\overline{P2}$ and $\overline{P4}$ are four NAND logic circuits N1, N2, N3 and N4. The NAND N1 receives $\overline{P1}$, $\overline{P2}$ and $\overline{P4}$, the NAND N2 receives P1, $\overline{P2}$ and $\overline{P4}$, the NAND N3 receives $\overline{P1}$, P2 and $\overline{P4}$, and the NAND N4 receives P1, P2 and $\overline{P4}$. The logical operation of each of the NANDs N1, N2, N3 and N4 is such that for a 0 logical output to be supplied therefrom a 1 logical input must be supplied to each of the inputs. Under all other input conditions the NAND will supply a 1 logical output therefrom. The output of the NANDs N1, N2, N3 and N4 are respectively applied to the input of inverters I1, I2, I3 and I4, which invert the input applied thereto to supply the logical complement thereof as the outputs D0, D1, D2 and D3.

The generation of the outputs D0, D1, D2 and D3 according to the waveform diagram of FIG. 3 may be seen from the following. During the time period t0–t1 the NAND 1 receives 1 logical input from $\overline{P1}$, $\overline{P2}$ and $\overline{P4}$ in that P1, P2, and P4 during this time period are at 0 states and therefore provide a 0 output to inverter I1. The NANDs N2, N3 and N4 each having a 0 applied as an input thereto thus apply 1 output to inverters I2, I3 and I4 which inverts them so that the outputs D1, D2 and D3 are at 0 output levels. The inverter I1, however, receiving a 0 input, inverts this to a 1 input so that the output D0 is at a 1 logic state between the times t0 and t1. At the time t1, however, the input $\overline{P1}$ to NAND N1 reverts to a 0 in that the output changes to a 1, which is inverted to a 0 as the output D0. The NAND N2, however, receives three 1 inputs and therefore outputs a 0 to inverter I2 which then supplies a 1 output as the output D1. D1 remains at the 1 output level until the time t2 when P1 goes to 0 and P2 goes to a 1. The NAND N3 then outputs a 0 which is inverted to supply the 1 output at D2 during the time period t2–t3. At the time t3, the outputs P1 and P2 are 1's and the output P4 is a 0. This causes the NAND N4 to output a 0 which is inverted in the inverter I4 to provide the output D3 at a 1 level during the time period t3–t4. At the time t4, P4 is a 1 and P1 and P2 are 0's. $\overline{P4}$ is applied to each of the NANDs N1, N2, N3 and N4 therefore each of these will receive a 0 input during the time period t4–t5 and thus the outputs D0, D1, D2 and D3 will be 0 during this time period.

It will thus be seen that the circuit configuration of FIG. 2 provides the output waveforms D0, D1, D2 and D3 as shown in FIG. 3 which may be utilized for any timing or control function as desired. Also the pulse waveforms P0, P1, P2, P4, $\overline{P1}$, $\overline{P2}$, $\overline{P4}$ can also be utilized for various logical functions, as desired.

In the circuit configuration of FIG. 2, test networks of the weighted type and the unweighted type are utilized and receive their inputs from selected test circuit points to provide a composite output for monitoring the operation of the circuit configuration. The three flip-flops FF1, FF2 and FF4 tandemly connected as shown operate as a counter which counts in a binary fashion. The first pulse X1 from the clock oscillator 60 in the pulse train P0 to be counted as shown in curve P0 of FIG. 3 has a 0 value during a time period beginning at t1. Subsequent pulses to be counted are indicated as X2, X3, X4, X5, X6 and X7. The counting operation for the flip-flops FF1, FF2 and FF4 is summarized in the following table.

TABLE A

| Pulse No. | Outputs P1 P2 P4 |
|---|---|
| X0 | 0 0 0 |
| X1 | 1 0 0 |
| X2 | 0 1 0 |
| X3 | 1 1 0 |
| X4 | 0 0 1 |
| X5 | 1 0 1 |
| X6 | 0 1 1 |
| X7 | 1 1 1 |

When the flip-flop FF1 receives the eighth pulse X8, all of the flip-flops will have a zero primary output P1, P2 and P4 thereby resetting the counting operation.

The respective outputs P1, P2 and P4 and the complementary outputs $\overline{P1}$, $\overline{P2}$ and $\overline{P4}$ of the three flip-flops are thus interrelated. Due to this fact, it is not necessary that each of the outputs be individually displayed in order to determine whether the counting operation is taking place as desired. Whenever the outputs in a particular logic operation are interrelated, for example, in a binary counting scheme, it is highly desirable to utilize a weighted type of testing network. In FIG. 2, components of the weighted testing network are designed with a "w" and includes the resistors $Rw$, $Rw/2$ and $Rw/4$ which are weighted according to the number designation, that is, the resistance of the resistor $Rw/2$ is equal to one-half resistance of resistor $Rw$ and the resistor $Rw/4$ is equal to one-fourth the resistance of the resistor $Rw$. The bottom end of the resistor $Rw$ is connected to the test circuit point $Jw1$ at the complementary output $\overline{P1}$ of the flip-flop FF1, the bottom end of the resistor $Rw/2$ is connected to a test circuit point $Jw2$ at the complementary output $\overline{P2}$ of the flip-flop FF2 and the bottom end of the resistor $Rw/4$ is connected to the test circuit point $Jw4$ at the complementary output $\overline{P4}$ of the flip-flop FF4. The top ends of the resistors $Rw$, $Rw/2$ and $Rw/4$ are commonly connected to a sensing junction $Jw0$. A load resistor $RwL$ is connected between the sensing junction $Jw1$ and a source of operating potential V+, which in the present example would comprise a positive polarity voltage. The composite voltage developed across the resistor $RwL$, between the point $Jw0$ and the V+ terminal, in response to the current supplying through each of the resistors $Rw$, $Rw/2$ and $Rw/4$ is supplied to display or sensing circuit, for example, a pair of vertical reflection plates of an oscilloscope.

The circuit points $Jw1$, $Jw2$ and $Jw4$ at the complementary outputs of the flip-flops FF1, FF2 and FF4, respectively, were selected as a matter of convenience and it should be noted that the outputs P1, P2 and P4 could have been selected.

The weighted testing network is so arranged that current will be translated through the weighted resistors $Rw$, $Rw/2$ and $Rw/4$ whenever the complementary output to which the free end of resistors is connected is at a 0 binary state. Thus a current path will be provided from the source V+, the load resistor $RwL$ and the respective weighted $Rw$, $Rw/2$ or $Rw/4$. Since the resistors $Rw$, $Rw/2$ and $Rw/4$ are weighted as described and assuming the voltage V+ will cause one unit of current to flow in the resistor R$w$ when $\overline{P1}$ is at a zero value, the resistor R$w$/2 and the resistor R$w$/4 will then, respectively, permit 2 units of current and 4 units of current to pass therethrough when their respective test points J$w$2 and J$w$4 are at 0 values. The composite current that passes through the resistors R$w$, R$w$/2 and R$w$/4 passes through the load resistor R$w$L so that the total voltage V$w$L developed across the load resistor R$w$L is the sum of the individual currents through the weighted resistors R$w$, R$w$/2 and R$w$/4 times the resistance value of the load resistor R$w$L.

The composite voltage developed across the load resistor R$w$L for the various complementary outputs $\overline{P1}$, $\overline{P2}$, and $\overline{P4}$ are illustrated in the following Table B.

TABLE B

| Pulse No. | Voltage VwL Across RwL | Complementary Outputs | | |
|---|---|---|---|---|
| | | P1 | P2 | P4 |
| X0 | 0 | 1 | 1 | 1 |
| X1 | VwL | 0 | 1 | 1 |
| X2 | 2VwL | 1 | 0 | 1 |
| X3 | 3VwL | 0 | 0 | 1 |
| X4 | 4VwL | 1 | 1 | 0 |
| X5 | 5VwL | 0 | 1 | 0 |
| X6 | 6VwL | 1 | 0 | 0 |
| X7 | 7VwL | 0 | 0 | 0 |

It can thus be seen from this table that the voltage developed by the load resistor R$w$L increases proportionately as the pulse count from the clock oscillator CO for the pulses X1, X3 X3.... As an example of this, for the first pulse X1 1, curve P0 of FIG. 3, one unit voltage V$w$L will be developed by the load resistor R$w$L since only the resistor R$w$ will pass a unit of current thereto. This may be seen in that the complementary output $\overline{P1}$ is at a 0 state permitting the translation of current through resistor R$w$, while the complementary outputs $\overline{P2}$ and $\overline{P4}$ are at 1 states which block passage of current through the resistors R$w$/2 and R$w$/4. In the case when the second pulse X2 appears, as shown in Table B, the complementary output $\overline{P2}$ is at a 0 state while the complementary outputs $\overline{P1}$ and $\overline{P4}$ are at 1 states. Thus only the resistor R$w$/2 will translate current therethrough which will be of a magnitude twice that of the current translated by the resistor R$w$ since the resistance of the resistor R$w$/2 is one-half the value of the resistor R$w$. Hence the voltage 2V$w$L will be developed across the load resistor R$w$L due to the doubling of the current flow therethrough. For the third pulse X3 the complementary outputs $\overline{P1}$ and $\overline{P2}$ are at 0 and the complementary output P4 is a 1 value. Thus current will be translated through the resistors R$w$ and R$w$/2. This will mean a current flow of one unit through the resistor R$w$ and two units through the resistor R$w$/2 making a total current flow of three units through the load resistor R$w$L. Therefore, in response to the flow of three units of current, a voltage of 3V$w$L will be developed across the load resistor R$w$L. The operation of the weighted testing network will continue as illustrated in Table B for the subsequent pulse count up to the eight pulse which will cause the voltage across the resistor R$w$L to return to a zero value.

The separate source of positive operating voltage V+ has been used rather than using the positive 1 logic output of the selected logic elements. This avoids loading undesirably the output of the logic elements. If it were desired to cause current flow through the various resistors of the testing network when a 1 state exists rather than when a 0 state exists this could be accomplished by replacing the positive operating voltage V+ with a negative operating voltage V− of suitable magnitude to permit current flow only when a selected logic element has a 1 output and to block current flow if a 0 output exists.

FIG. 4A shows a display waveform of the normal operation of the counting function of the flip-flops FF1, FF2, and FF4. The waveform as shown in FIG. 4A may be conveniently displayed on the oscilloscope by connecting the junction J$w$0 and the V+ terminal to respective vertical deflection plates of an oscilloscope and applying a convenient time reference waveform to the horizontal deflection plates thereof that will permit the stationary display of the composite voltage output developed across the load resistor R$w$L.

It can be seen from FIG. 4A that the waveform increases in a set manner for each of pulses X1, X2, X3 ..., until the voltage 7V$w$L is reached within the seventh pulse X7. The voltage then goes to a reference value with the eighth pulse. The waveform shown in FIG. 4A is for normal operation and any deviation from this normal waveform will be indicative of a malfunction of the counting operation of the flip-flops FF1, FF2, or FF4.

FIG. 4B shows a malfunction condition wherein the flip-flop FF4 is not operating properly. Thus as shown in FIG. 4B, the first three pulses cause the step waveform to be developed as under normal operation. However, when the fourth pulse is received, which would normally cause the complementary output to go to a 0 binary level and cause four units of current to pass through the resistor R$w$/4, and also the load resistor R$w$L, a malfunction of the flip-flop FF4 prohibits this change from taking place. Hence, at this time of the fourth pulse, the voltage developed across the load resistor R$w$L is zero since there is no current flow through the resistor R$w$/4 or the resistors R$w$ and R$w$/2. At the receipt of the fifth pulse, the flip-flop FF1 causes a 0 complementary output $\overline{P1}$ to appear which causes one unit of current to pass through the load resistor R$w$L and the resistor R$w$ with one unit of composite voltage being displayed in FIG. 4B. The sixth and seventh pulses cause the step waveform to rebuild, however, with the absence of the four units of voltage normally developed by the proper operation of the flip-flop FF4.

With the display of the waveform of FIG. 4B, it would become apparent to a monitor of the system that the flip-flop FF4 is not functioning properly and remedial action could then be taken to replace or repair this particular logic component. It can thus be seen from the above explanation that the weighted testing network not only indicates that a malfunction has occurred in the counting operation but points out which of the particular logic components of the counter has malfunctioned which expedites taking corrective action. Only three resistors are shown in the weighted testing network associated with the three flip-flops FF1, FF2 and FF4. It should be understood, of course, that for higher count counters additional resistors weighted according to the ratio: R$w$/$2^{n-1}$, where $n$ is the number of the resistor in the network with the first resistor R$w$ having the number 1, could be utilized. Also the weighted testing network could be utilized in other counting schemes such as a binary coded decimal scheme wherein the counter resets upon the 10th pulse rather than upon other number counts. Also the weighted testing network could be utilized in any logic configuration wherein the outputs of the plurality of interconnected logic components have a predetermined relationship with respect to each other, that is, where the respective outputs thereof change in a predetermined pattern in response to the inputs thereto.

In FIG. 2 an unweighted testing network is also incorporated therein for monitoring the operation of the D0, D1, D2 and D3 outputs of the inverters I1, I2, I3 and I4, respectively. Test circuit points J$u$1, J$u$2, J$u$3 and J$u$4 are connected respectively at the output of the inverters I1, I2, I3 and I4. Unweighted resistors R$u$1, R$u$2, R$u$3 and R$u$4 are connected between the respective test points J$u$1, J$u$2, J$u$3 and J$u$4 and a sensing junction J$u$0. The unweighted resistors R$u$1, R$u$2, R$u$3 and R$u$4 may conveniently have the same resistance value. Between the sensing junction J$u$0 and a source of operating potential V+ is connected a load resistor R$u$L, with the voltage developed across the load resistor R$u$L being sensed to be applied to a display or sensing circuit such as to vertical deflection plates of an oscilloscope. The source voltage V+ is selected to have a positive polarity.

The outputs D0, D1, D2 and D3 are shown in curves D0, D1, D2 and D3 of FIG. 3 and it can be seen that during the time period t0–t4 a logical 1 output is sequentially provided under normal operating conditions from D0 through D3. Thus, when one of the outputs D0, D1, D2 or D3 is at a 1 level, the other three of the outputs are at a 0 level. Thus, with three of the outputs at a 0 level and one at a 1 level, current will be translated from the source V+ through the load resistor R$u$L and three of the unweighted resistors to develop a three-unit load voltage across the load resistor R$u$L. No current will be translated through the other resistors in that the output applied thereto will be at a 1 level. As the outputs D0, D1, D2 and D3 sequentially switch from a 1 output at D0 to 1 outputs at D1, D2 and D3, the voltage across the load resistor R$u$L will remain substantially constant in that at any given time three of the unweighted resistors will translate current thereto while the other one will be nonconductive.

FIG. 5A is a display waveform of the voltage developed between the sensing junction point J$u$1 and a ground reference point under normal operating conditions. The display waveform could be conveniently displayed on an oscilloscope by the application thereof to a pair of vertical deflection plates with a suitable time reference being applied to the horizontal deflection plates thereof. As can be seen by FIG. 5A, the constant output voltage is indicated by a straight line disposed a distance of three units, for example, from a ground reference line indicated by the dotted line. As long as the inverters I1, I2, I3 and I4 provide the sequential waveforms shown in curves D0, D1, D2 and D3 of FIG. 3, the substantially constant output as shown in FIG. 5A will be provided. If a malfunction of any of the inverters I1, I2, I3 or I4 or of any of the NAND circuits N1, N2, N3 and N4 should occur, the waveform of FIG. 5A will deviate from that shown and would indicate that a malfunction of one of the circuit components has occurred.

FIG. 5B shows a malfunction condition with the display voltage deviating from its substantially constant value during the time interval t2–t3 of FIG. 3. The malfunction indicated by the waveform of FIG. 5B is that at the time t2 the output D1 has not changed from a 0 to a 1 level but rather has remained at the 0 level. Therefore, all four of the resistors R$u$1, R$u$2, R$u$3 and R$u$4 will translate current therethrough so that a four-unit load voltage would be developed across the load resistor R$u$L. The waveform of FIG. 5B indicates that a malfunction has occurred either in the inverter I3 or the NAND N3 which supplies the input to the inverter I3. These two logic elements should be checked in order to correct the malfunction. Any waveform displayed other than the waveform of FIG. 5A would be indicative of some malfunction in the circuit configuration requiring corrective action.

Only four resistors R$u$1, R$u$2, R$u$3 and R$u$4 have been shown in the present example, however, it should be understood that other resistors could be utilized. Also, if desired, the test points J$u$1, J$u$2, J$u$3 and J$u$4 could be taken from the output of the NAND circuits N1, N2, N3 and N4. However, by placing test points at the output of the inverters I1, I2, I3 and I4, respectively, malfunctions of both the associated NAND and inverter circuit can be done with a single test point.

It can thus be seen that by the incorporation of the weighted and unweighted testing network into the circuit configuration of FIG. 2 complete monitoring of circuit configuration is provided while the system is operating under normal conditions. If a malfunction should occur in a logic element thereof, the displayed waveform indicates not only that a malfunction has occurred but also which of the logic components is the probable cause of the malfunction. Moreover, the composite output provided at the weighted sensing junction J$w$0 and unweighted sensing junction J$u$0 could be displayed on separate channels of a multichannel oscilloscope and thereby provide complete monitoring of the total system, while state of the art test procedures would require seven separate channels in order to display the separate output information appearing at each of the test circuit points J$w$1, J$w$2, J$w$4, J$u$1, J$u$2, J$u$3 and J$u$4.

Although the present invention has been described with a certain degree of particularity, it should be understood that the present disclosure has been made only by way of example and the numerous changes in the details of the circuitry and the construction and the combination arrangement of parts, elements and components can be resorted to without departing from the spirit and scope of the present invention.

What I claim is:

1. The combination comprising:
   a. a plurality of logic elements disposed in a predetermined manner to perform a selected logic function, each logic element having an output indicative of the logic state of the element,
   b. a plurality of circuit points each connected to sample the output of a different one of said logic elements, said plurality of circuit points being normally pulsed in a predetermined sequence by their respective associated logic elements,
   c. a point of reference potential;
   d. a junction;
   e. a load impedance connected between said reference point and said junction over the time of said sequence,
   f. a plurality of impedance elements, each connected between said junction and a different one of said plurality of circuit points over the time of said sequence, whereby said load impedance senses the composite output of said circuit points; and
   g. means connected to said load impedance for sensing the output across said load impedance developed in response to the composite output of said plurality of circuit points, said output of said load impedance being indicative of whether or not the selected logic function is being performed.

2. The combination of claim 1 wherein:
said plurality of impedance elements bear a predetermined relationship to each other.

3. The combination of claim 2 wherein:
said predetermined relationship being that said plurality of impedance elements have respectively weighted impedances.

4. The combination of claim 1 wherein:
said predetermined relationship being that said plurality of impedance elements have substantially the same impedance.

5. The combination of claim 1 wherein said means for sensing in clause g comprises time referenced visual display means.

6. The combination as in claim 1 wherein each of said plurality of impedance elements is weighted according to the ratio $R/2^{n-1}$, where $n$ is the sequence number of the impedance and R is the impedance value of the first in sequence impedance element of the plurality.

7. The combination as in claim 1 wherein said plurality of impedance elements have respectively different impedances weighted in accordance with a desired pattern.

8. The combination as in claim 1 wherein said means for sensing in clause g is connected directly to said junction.

9. The combination as in claim 8 wherein said plurality of impedance elements have substantially the same impedance.

10. The combination as in claim 8 wherein said plurality of impedance elements have respectively different impedances weighted in accordance with a desired pattern.

11. The combination as in claim 8 wherein each of said plurality of impedance elements is weighted according to the ratio $R/2^{n-1}$, where $n$ is the sequence number of the impedance and R is the impedance value of the first in sequence impedance element of the plurality.

12. The combination of claim 8 wherein said means for sensing in clause g comprises time referenced visual display means.